US011601489B2

(12) United States Patent
Ma

(10) Patent No.: US 11,601,489 B2
(45) Date of Patent: Mar. 7, 2023

(54) METHOD FOR TRANSMITTING STREAM, STREAMING SERVER AND STORAGE MEDIUM

(71) Applicant: APOLLO INTELLIGENT CONNECTIVITY (BEIJING) TECHNOLOGY CO., LTD., Beijing (CN)

(72) Inventor: Chenghai Ma, Beijing (CN)

(73) Assignee: APOLLO INTELLIGENT CONNECTIVITY (BEIJING) TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/716,371

(22) Filed: Apr. 8, 2022

(65) Prior Publication Data

US 2022/0232058 A1    Jul. 21, 2022

(30) Foreign Application Priority Data

May 12, 2021    (CN) .......................... 202110518316.X

(51) Int. Cl.
*H04L 65/70* (2022.01)
*H04L 67/53* (2022.01)
*H04L 67/55* (2022.01)

(52) U.S. Cl.
CPC .............. *H04L 65/70* (2022.05); *H04L 67/53* (2022.05); *H04L 67/55* (2022.05)

(58) Field of Classification Search
CPC .......... H04L 65/70; H04L 67/53; H04L 67/55

USPC ........................................................ 709/219
See application file for complete search history.

(56) References Cited

U.S. PATENT DOCUMENTS

| | | | |
|---|---|---|---|
| 2010/0131659 A1 | 5/2010 | Narayana et al. | |
| 2010/0153827 A1* | 6/2010 | Koster | H04L 65/80 709/236 |
| 2010/0228875 A1 | 9/2010 | Myers | |
| 2011/0276712 A1* | 11/2011 | Narula | H04N 21/2381 709/231 |
| 2014/0215026 A1* | 7/2014 | Beeson | H04L 65/60 709/219 |

FOREIGN PATENT DOCUMENTS

| | | |
|---|---|---|
| CN | 101707615 A | 5/2010 |
| CN | 103581699 A | 2/2014 |
| CN | 103873486 A | 6/2014 |
| CN | 104111818 A | 10/2014 |

(Continued)

OTHER PUBLICATIONS

First OA for CN application 202110518316.X dated Oct. 11, 2021.
(Continued)

*Primary Examiner* — James E Springer
(74) *Attorney, Agent, or Firm* — Maschoff Brennan

(57) ABSTRACT

A method for transmitting a stream includes: receiving a streaming request from a stream receiver, in which the streaming request includes a stream identifier and a type of the stream receiver; obtaining an encapsulated stream by performing protocol encapsulation on a stream corresponding to the stream identifier based on a streaming protocol corresponding to the type; and transmitting the encapsulated stream to the stream receiver.

14 Claims, 9 Drawing Sheets

(56) References Cited

FOREIGN PATENT DOCUMENTS

| | | | | |
|---|---|---|---|---|
| CN | 104539596 A | | 4/2015 | |
| CN | 105391968 A | * | 3/2016 | ............. H04N 7/157 |
| CN | 107529097 A | | 12/2017 | |
| CN | 111818360 A | | 10/2020 | |
| CN | 112073423 A | | 12/2020 | |
| CN | 111818360 B | * | 4/2021 | ......... H04N 21/2187 |
| WO | 2020140625 A1 | | 7/2020 | |

OTHER PUBLICATIONS

Second OA for CN application 202110518316.X dated Jan. 17, 2022.
CN Office Action in Application No. 202110518316.X dated May 5, 2022.
CN Notice of Allowance in Application No. 202110518316.X dated Jul. 27, 2022.
European Search Report issued in corresponding application No. 22164884.3, dated Sep. 8, 2022.

* cited by examiner

METHOD FOR TRANSMITTING STREAM, STREAMING SERVER AND STORAGE MEDIUM

CROSS-REFERENCE TO RELATED APPLICATION

This application claims priority to Chinese Patent Application No. 202110518316.X, filed on May 12, 2021, the entire content of which is incorporated herein by reference.

TECHNICAL FIELD

The disclosure relates to the field of artificial intelligence techniques, especially to the fields of intelligent transportation and computer vision, and in particular to a method for transmitting a stream, a streaming server and a streaming system.

BACKGROUND

In an intelligent traffic information control project, stream data (e.g., video data) are obtained by accessing a large number of road intersection security monitoring cameras, for subsequent artificial intelligence (AI) algorithm processing and for processing the stream data on a browser side (e.g., playing videos for lane marking).

In the related art, streams (e.g., video streams) are pulled from streaming services of different manufacturers by adopting private streaming servers and integrating Software Development Kits (SDKs) of different manufacturers. However, access protocols of various camera suppliers are different, qualities of different SDK implementations of different manufacturers are uneven, and protocols are incompatible with each other. Therefore, the stream may not be directly processed on the browser side, which reduces the real-time performance of the stream.

SUMMARY

The disclosure provides a method for transmitting a stream, a streaming server and a streaming system.

According to a first aspect of the disclosure, a method for transmitting a stream is provided. The method includes: receiving a streaming request from a stream receiver, in which the streaming request includes a stream identifier and a type of the stream receiver; obtaining an encapsulated stream by performing protocol encapsulation on a stream corresponding to the stream identifier based on a streaming protocol corresponding to the type; and transmitting the encapsulated stream to the stream receiver.

According to a second aspect of the disclosure, a streaming server is provided. The streaming server includes at least one processor and a memory communicatively coupled to the at least one processor. The memory is configured to store instructions executable by the at least one processor, and when the instructions are executed by the at least one processor, the at least one processor is caused to perform the method as described above.

According to a third aspect of the disclosure, a non-transitory computer-readable storage medium having computer instructions stored thereon is provided. The computer instructions are configured to cause a computer to perform the method as described above.

It should be understood that the content described in this section is not intended to identify key or important features of embodiments of the disclosure, nor is it intended to limit the scope of the disclosure. Additional features of the disclosure will be easily understood based on the following description.

BRIEF DESCRIPTION OF THE DRAWINGS

The drawings are used to better understand solutions and do not constitute a limitation to the disclosure, in which.

DETAILED DESCRIPTION

Figure 1:
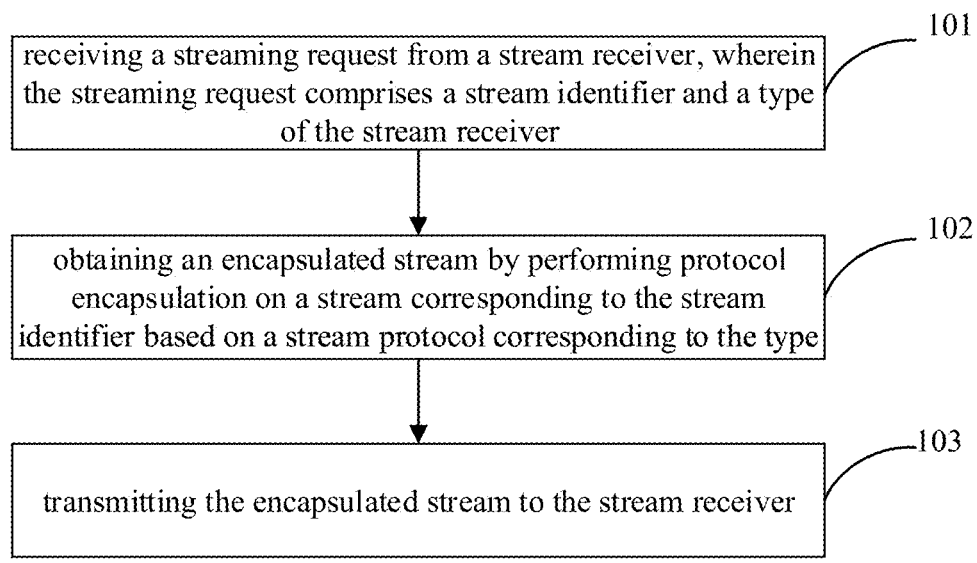
FIG. 1 is a schematic diagram of a first embodiment of the disclosure.

The following describes embodiments of the disclosure with reference to the drawings, which includes various details of embodiments of the disclosure to facilitate understanding and shall be considered merely exemplary. Therefore, those of ordinary skill in the art should recognize that various changes and modifications can be made to embodiments described herein without departing from the scope and spirit of the disclosure. For clarity and conciseness, descriptions of well-known functions and structures are omitted in the following description.

In an intelligent traffic information control project, stream data (e.g., video data) are obtained by accessing a large number of road intersection security monitoring cameras, for subsequent artificial intelligence (AI) algorithm processing and for processing the stream data on a browser side (e.g., playing videos for lane marking).

Since the intelligent traffic information control system based on video perception needs high-accuracy traffic indicators as data support, real-time requirements for streams are extremely high. The intelligent traffic information control project is often connected to a large number of high-definition and high-resolution cameras, high-concurrency and high-performance streaming servers are required for forwarding streams.

In the related art, the streaming server obtains streams in the following three ways. The first way is to directly connect to a front-end camera according to a real-time streaming protocol (RTSP) and to directly obtain RTSP streams (e.g., video streams) from the front-end camera. The second way is to connect to a third-party streaming platform through the SDK based on private protocols of various security manufacturers and to pull streams by interacting with the third-party streaming platform according to the SDK related to the third-party streaming platform, TCP and the private protocols. The third way is to connect to the third-party vendor platform through the GB28181 protocol to provide real-time video stream forwarding services based on the RTSP protocol.

However, the first way can only be applied to the scenario of accessing a small number of device manufacturers. The streaming server needs to be connected with the front-end device under the network of China Unicom. When the network is isolated and the streaming server may not be directly connected to the front-end camera, the streams may not be obtained. The front-end device has limited bandwidth and processing capacity, so that when accessing the same device concurrently, the front-end device often fails to respond. In the second way, due to numerous security manufacturers, complicated and complicated protocols, long development cycle, and most of the SDK output stream formats being private protocols, an exclusive parsing library needs to be used. Moreover, the streams need to be played on a special client and may not be played on the browser. For the third way, the browser-side playback protocol may not be provided, and the IE browser-based playback plug-in may not perform operations such as lane marking on mainstream browsers.

In conclusion, since there are a large number of camera suppliers involved, access protocols are very different, qualities of SDKs of different manufacturers are uneven, and protocols are incompatible with each other, the stream may not be processed on the browser side, which reduces the real-time problem of the stream. The disclosure provides a method for transmitting a stream, a streaming server and a streaming system.

FIG. 1 is a schematic diagram of a first embodiment of the disclosure. It should be noted that the method for transmitting the stream of some embodiments of the disclosure can be applied to a streaming server, that is, the method for transmitting the stream of some embodiments of the disclosure is described from the streaming server side.

As illustrated in FIG. 1, the method for transmitting the stream includes the following.

In 101, a streaming request from a stream receiver is received, in which the streaming request includes a stream identifier and a type of the stream receiver.

In some embodiments of the disclosure, in order to obtain the stream, the stream receiver may transmit the streaming request to the streaming server, and the streaming server may receive the streaming request transmitted by the stream receiver. It should be noted that the streaming request may include, but not limited to, the stream identifier and the type of the stream receiver.

The stream identifier can be used to identify the stream, for example, the stream identifier can be a stream identity document (ID). The type of the stream receiver may include but not limited to a browser type or a non-browser type.

In 102, an encapsulated stream is obtained by performing protocol encapsulation on a stream corresponding to the stream identifier based on a streaming protocol corresponding to the type.

It is understood that types of stream receivers are different and streaming protocols corresponding to types are also different. For example, a streaming protocol corresponding to a browser type can be Real Time Messaging Protocol (RTMP) or HTTP-FLV (a kind of streaming protocol). A stream protocol corresponding to a non-browser type can be Real Time Streaming Protocol (RTSP).

In order to make the streaming server provide streaming protocols and the stream receiver directly process the stream forwarded by the streaming server, as a possible implementation of some embodiments of the disclosure, the streaming server can perform the protocol encapsulation on the stream corresponding to the stream identifier based on the streaming protocol corresponding to the type of the stream receiver.

For example, a video stream is encapsulated according to the RTSP protocol to facilitate identification of image information in the video stream; and is encapsulated according to the RTMP or the HTTP-FLV protocol to provide a standard video stream that can be played by the browser side.

In 103, the encapsulated stream is transmitted to the stream receiver.

The encapsulated stream is provided to the stream receiver, so that the stream receiver can process the stream, to improve the real-time performance of the stream. In some embodiments of the disclosure, the streaming server transmits the encapsulated stream to the stream receiver. The stream receiver can directly process the stream. For example, taking the stream receiver as a browser and the stream as a video stream as an example, the browser can directly play the video after receiving the encapsulated video stream. For example, if the stream receiver is a non-browser type, and the stream receiver receives the video stream encapsulated by the RTSP protocol, the stream receiver can perform image information identification and marking on the video stream encapsulated by the RTSP protocol.

In conclusion, the streaming request of the stream receiver is received by the streaming server, the encapsulated stream is obtained by performing the protocol encapsulation on the stream corresponding to the stream identifier based on the streaming protocol corresponding to the type, and the encapsulated stream is transmitted to the stream receiver. Therefore, the stream receiver can directly process the encapsulated stream, which improves the real-time performance of the stream.

Figure 2:
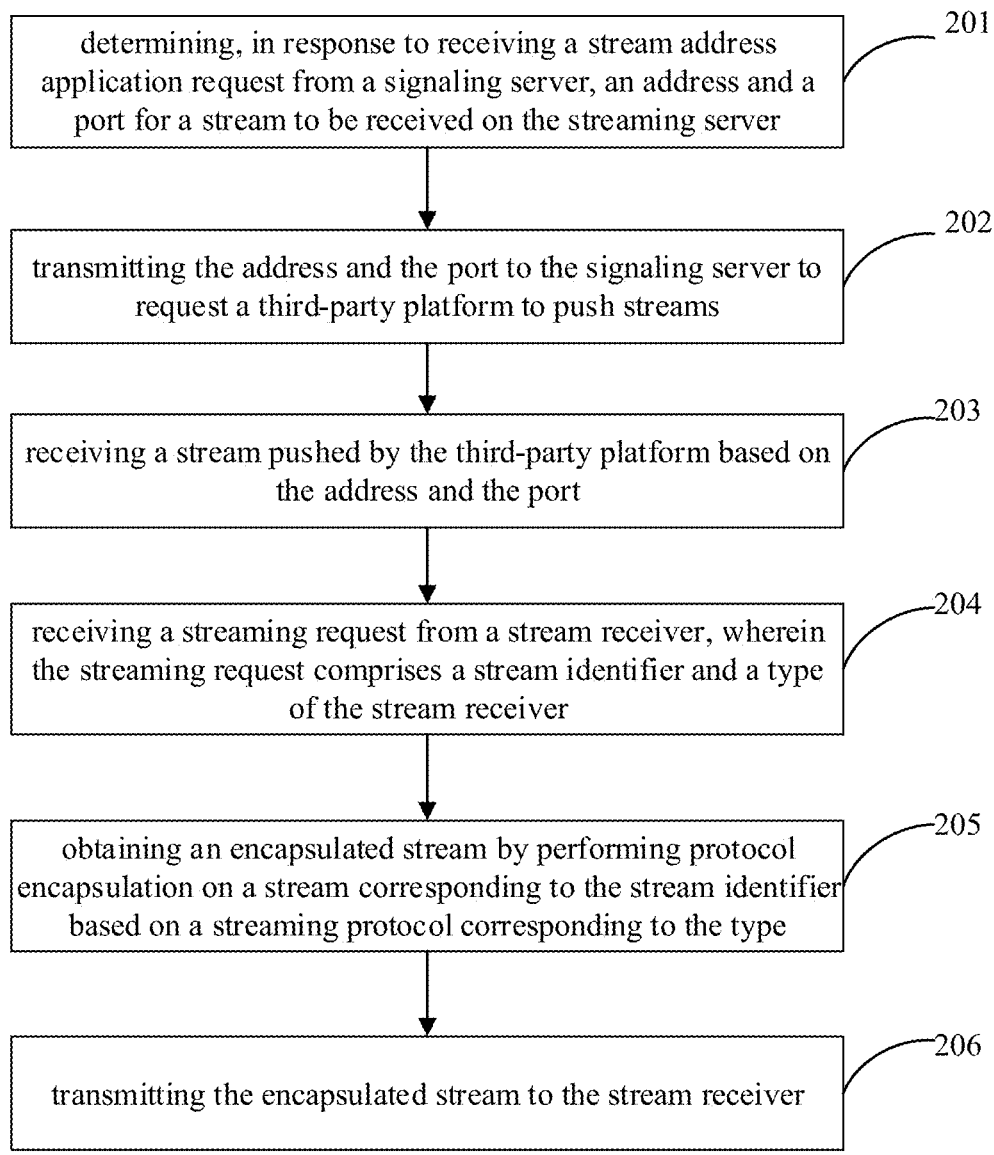
FIG. 2 is a schematic diagram of a second embodiment of the disclosure.

It can be understood that, after receiving the streaming request of the stream receiver, the streaming server encapsulates the stream according to the streaming request, and transmits the encapsulated stream to the stream receiver. Therefore, before receiving the streaming request of the stream receiver, the streaming server needs to obtain the stream in advance. As illustrated in FIG. 2, FIG. 2 is a schematic diagram of a second embodiment of the disclosure. In some embodiments of the disclosure, the streaming server may interact with a signaling server to determine an address and a port of a stream to be received, and a third-party platform pushes the stream to the streaming server according to the address and the port of the stream to be received. Embodiments of FIG. 2 are provided as follows.

In 201, in response to receiving a stream address application request from a signaling server, an address and a port for a stream to be received on the streaming server are determined.

It should be understood that the signaling server can interact with the third-party platform and the streaming server according to a national standard protocol (e.g., GB28181), and the streaming server can interact with the third-party platform according to the national standard protocol, to obtain the stream provided by the third-party platform. The streaming server can interact with the stream receiver according to the national standard protocol.

In order to enable the streaming server to receive the stream accurately, when the streaming request from the stream receiver is received, the signaling server can transmit the stream address application request to the streaming server. The streaming server determines the address and port for receiving the stream according to the stream address application request.

In 202, the address and the port are transmitted to the signaling server to request a third-party platform to push streams.

The streaming server can transmit the address and the port for receiving the stream to the signaling server, and the signaling server interacts with the third-party platform and requests the third-party platform to push the streams to the streaming server.

In 203, a stream pushed by the third-party platform based on the address and the port is received.

Further, the third-party platform pushes the stream to the streaming server according to the address and the port used by the streaming server to receive the stream.

In 204, a streaming request from a stream receiver is received, in which the streaming request includes a stream identifier and a type of the stream receiver.

In 205, an encapsulated stream is obtained by performing protocol encapsulation on a stream corresponding to the stream identifier based on a streaming protocol corresponding to the type.

In 206, the encapsulated stream is transmitted to the stream receiver.

In some embodiments of the disclosure, 204-206 may be implemented in any of some embodiments of the disclosure, which are not limited in some embodiments of the disclosure, and will not be repeated herein.

In order to illustrate some embodiments of the disclosure more clearly, examples are given.

Figure 3:
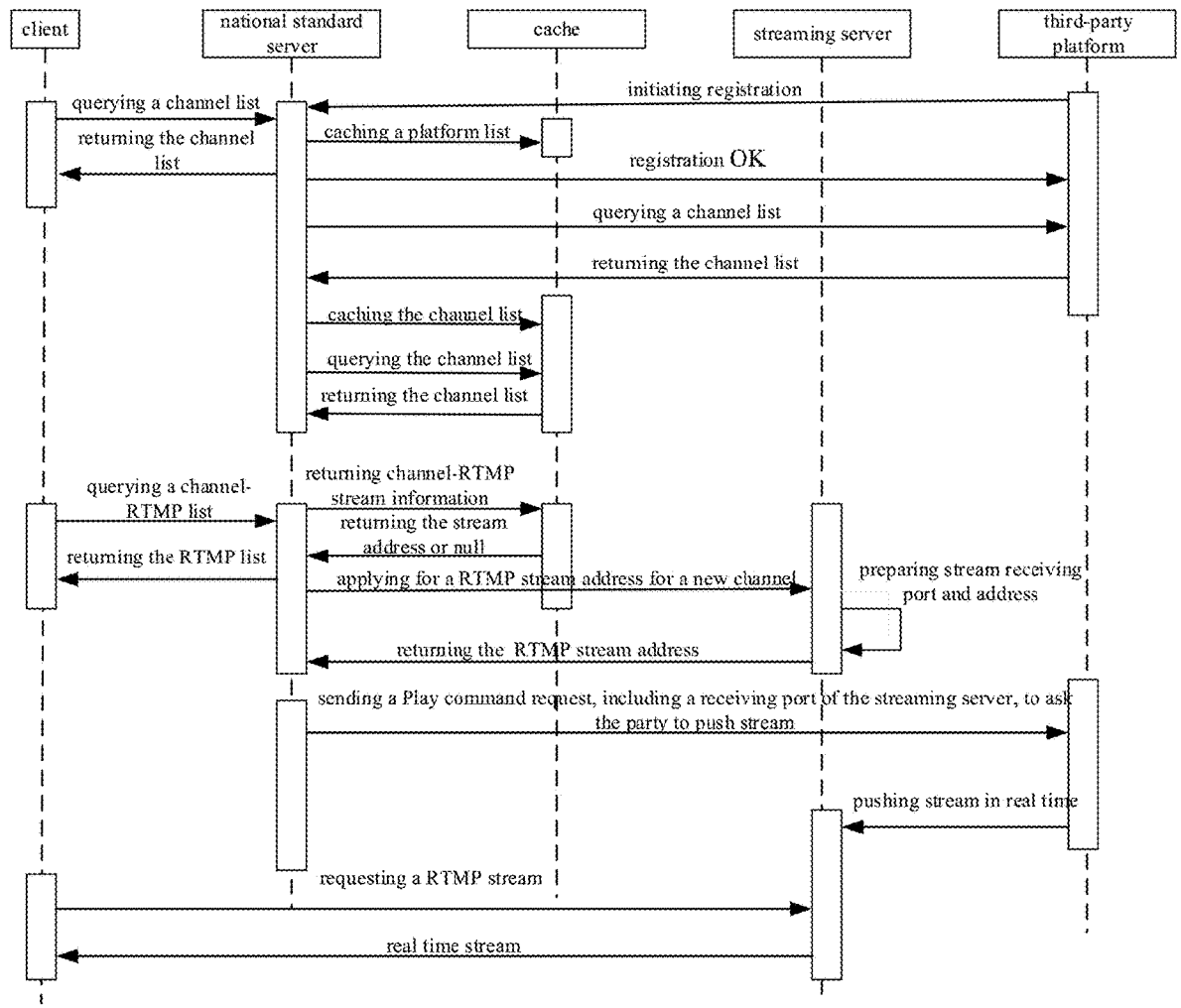
FIG. 3 is a sequence diagram of transmitting a stream according to some embodiments of the disclosure.

For example, as shown in FIG. 3, the national standard server is equivalent to the signaling server in some embodiments of the disclosure. The client is equivalent to the stream receiver in some embodiments of the disclosure. Before the national standard server transmits the stream address application request to the streaming server, the third-party platform can initiate a registration process to a registration center through the national standard server. The national standard server transmits a platform list of third-party platforms to a cache server. After the registration is succeed, the national standard server can obtain a channel list of the third-party platform (e.g., a camera list), and transmits the channel list to the cache server. In addition, in order to improve the concurrent capability of the streaming server, the national standard server can also obtain a list of streaming servers through the registration center, and transmits the list of streaming servers to the cache server. The client can query the cache server for the stream address corresponding to the channel through the national standard server. For example, the client queries the stream address corresponding to the RTMP streaming protocol and the channel through the national standard server, and the cache server returns the stream address. When there is no corresponding stream address, a message "Null" is returned. In addition, the national standard server can apply for the address and port of the stream to be received on the streaming server for a new channel. For example, the national standard server can send the stream address application request to the streaming server, and determine the address and the port of the stream to be received on the streaming server. The streaming server transmits the address and the port to the national standard server. The national standard server transmits a Play instruction request, to request the third-party platform to push the stream. The Play instruction request includes the address and port of the stream to be received. The third-party platform pushes the stream to the streaming server according to the address and the port, and the streaming server receives the streaming request from the client. The streaming request includes the type of the client as the browser type and the stream identifier, the protocol corresponding to the browser is RTMP, and the streaming server performs the protocol encapsulation on the stream corresponding to the stream identifier according to the streaming protocol corresponding to the type, obtains the encapsulated stream, and transmits the encapsulated stream (real-time video stream) to the client. The client can directly process the encapsulated stream.

In conclusion, the address and the port for the stream to be received on the streaming server are determined in response to receiving the stream address application request from the signaling server. The address and the port are transmitted to the signaling server to request the third-party platform to push the streams. The stream pushed by the third-party platform based on the address and the port is received. The streaming request of the stream receiver is received, in which the streaming request includes the stream identifier and the type of the stream receiver. The encapsulated stream is obtained by performing the protocol encapsulation on the stream corresponding to the stream identifier based on the streaming protocol corresponding to the type. The encapsulated stream is transmitted to the stream receiver. Therefore, the streaming server can accurately acquire the stream and forward the stream to the stream receiver, and the stream receiver can directly process the encapsulated stream, which improves the real-time performance of the stream.

Figure 4:
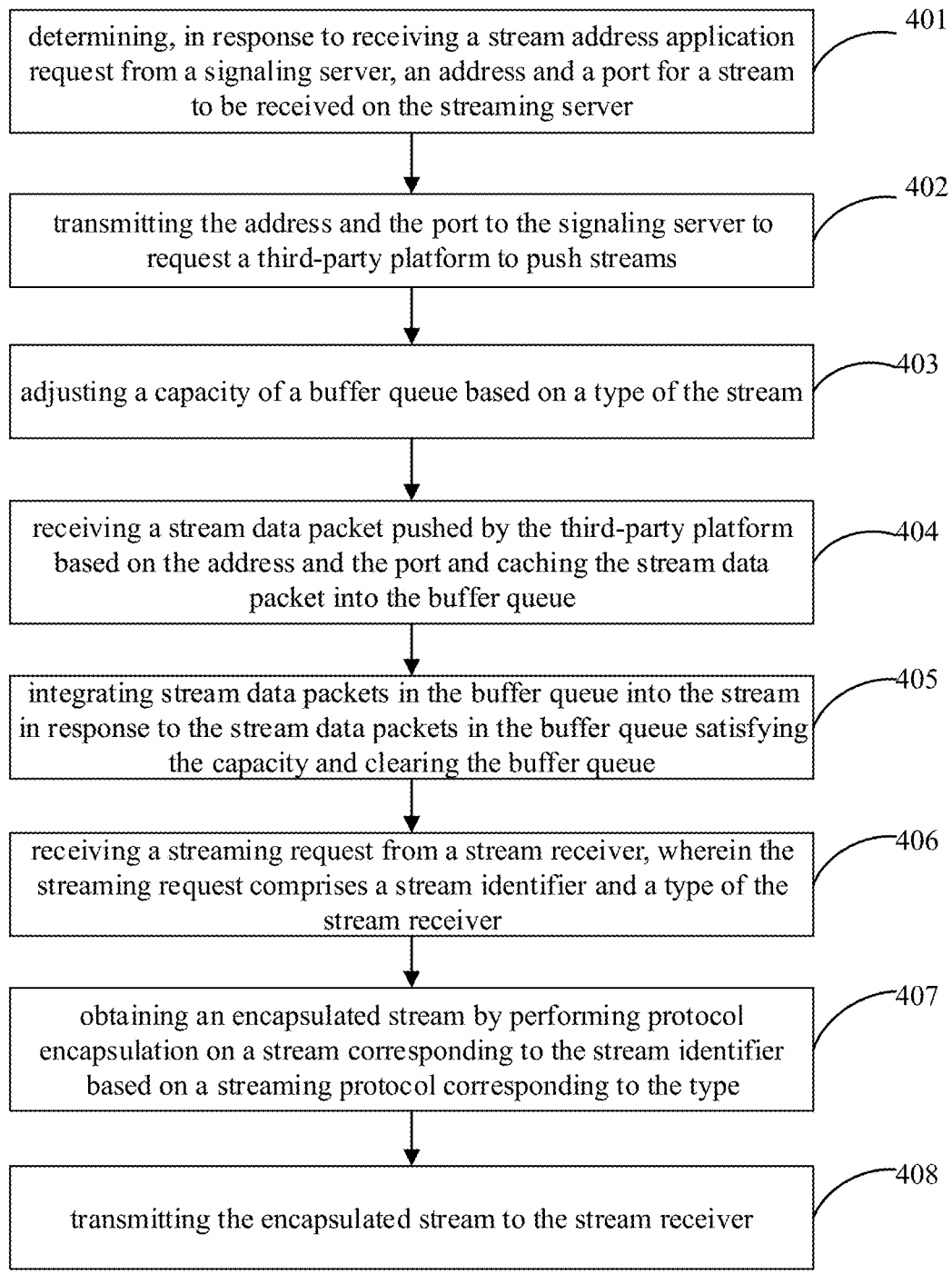
FIG. 4 is a schematic diagram of a third embodiment of the disclosure.

In order to reduce the delay of the stream and further improve the real-time performance of the stream, as shown in FIG. 4, FIG. 4 is a schematic diagram of a third embodiment of the disclosure. In some embodiments of the disclosure, when the stream pushed by the third-party platform according to the address and port is received, the streaming server can adjust a capacity of a buffer queue of the streaming server, to further improve the real-time performance of the stream. Some embodiments shown in FIG. 4 includes the following.

In 401, in response to receiving a stream address application request from a signaling server, an address and a port for a stream to be received on the streaming server are determined.

In 402, the address and the port are transmitted to the signaling server to request a third-party platform to push streams.

In 403, a capacity of a buffer queue is adjusted based on a type of the stream.

In some embodiments of the disclosure, the types of the streams are different, and the real-time requirements for the streams are also different. Therefore, for the real-time requirements of different streams, the capacity of the buffer queue can be dynamically adjusted according to the type of the stream.

For example, when the type of the stream is monitoring-type stream, the real-time requirement for the stream can be relatively high, and the capacity of the buffer queue can be shortened. For example, when the browser is monitoring the road by the video, the capacity of the cache queue of the streaming server can be shortened by canceling the GOP-cache (inter-frame cache), so that the frame rate of the video can be reduced, the delay of the stream can be reduced, and the real-time performance of the stream can be improved.

For example, when the type of the stream is non-monitoring stream, the real-time requirement for the stream can be reduced, and the capacity of the buffer queue of the streaming server may not be adjusted.

In 404, a stream data packet pushed by the third-party platform based on the address and the port is received, and the stream data packet is cached into the buffer queue.

In order to improve the performance of the streaming server and reduce the consumption of related resources, in some embodiments of the disclosure, when the streaming server receives stream data packets pushed by the third-party platform according to the address and port, the stream data packets are cached into the buffer queue.

In 405, stream data packets in the buffer queue are integrated into the stream in response to the stream data packets in the buffer queue satisfying the capacity and the buffer queue is cleared.

In order to further reduce the consumption of related resources, in some embodiments of the disclosure, when the stream data packets in the buffer queue satisfy the capacity, the stream data packets in the buffer queue are integrated into the stream, so that the streaming server forwards the stream and the buffer queue is cleared at the same time, to save the related resources.

In 406, a streaming request from a stream receiver is received, in which the streaming request includes a stream identifier and a type of the stream receiver.

In 407, an encapsulated stream is obtained by performing protocol encapsulation on a stream corresponding to the stream identifier based on a streaming protocol corresponding to the type.

In 408, the encapsulated stream is transmitted to the stream receiver.

In some embodiments of the disclosure, 401-402 and 406-408 may be implemented in any one of some embodiments of the disclosure, which are not limited in some embodiments of the disclosure, and will not be repeated.

In conclusion, in response to receiving the stream address application request of the signaling server, the address and port of the stream to be received on the streaming server are determined. The address and the port are transmitted to the signaling server, to request the third-party platform to push the streams. The capacity of the buffer queue is adjusted based on the type of the stream. The stream data packet pushed by the third-party platform based on the address and the port is received, and the stream data packet is cached into the buffer queue. In response to the stream data packets in the buffer queue satisfying the capacity, the plurality of stream data packets in the buffer queue are integrated into the stream, and the buffer queue is cleared. The streaming request of the stream receiver is received, and the streaming request includes the stream identifier and the type of the stream receiver. The encapsulated stream is obtained by performing the protocol encapsulation on the stream corresponding to the stream identifier based on the streaming protocol corresponding to the type. The encapsulated stream is transmitted to the stream receiver. Therefore, according to the type of the stream, the length of the buffer queue is adjusted, the delay of the stream is reduced, and the stream receiver can directly process the encapsulated stream, which further improves the real-time performance of the stream.

Figure 5:
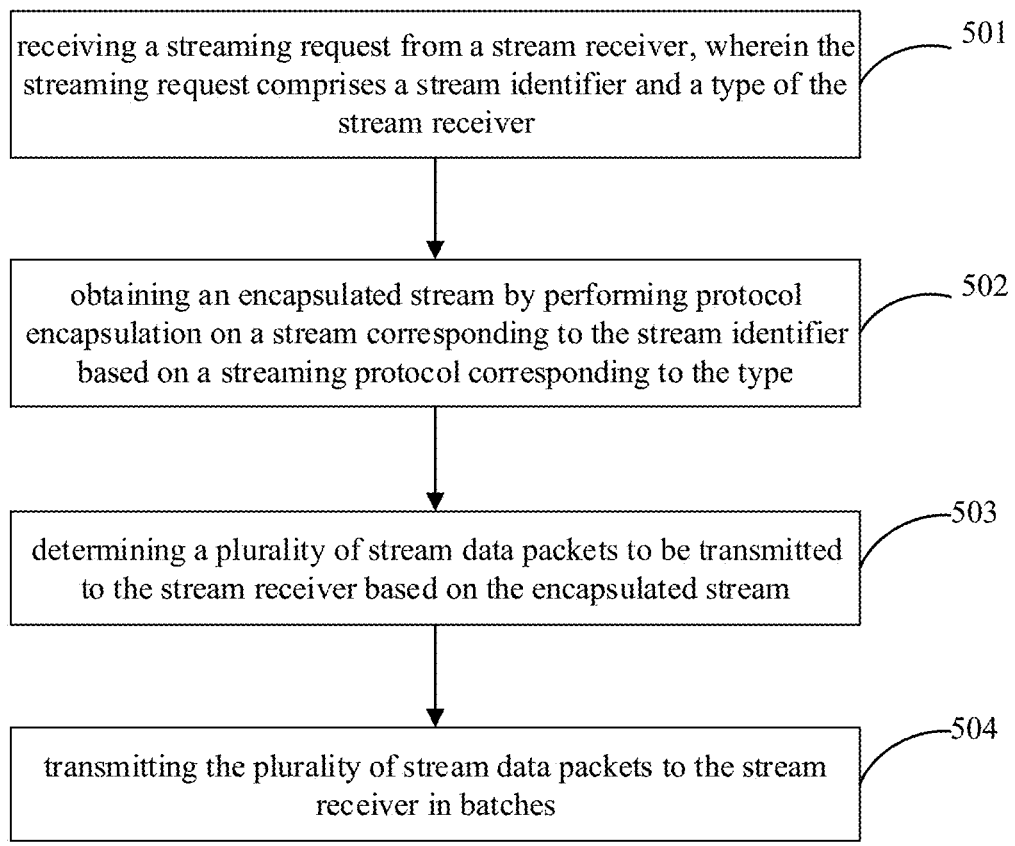
FIG. 5 is a schematic diagram of a fourth embodiment of the disclosure.

In order to improve the performance of the streaming server and improve the real-time performance of the stream, as shown in FIG. 5, FIG. 5 is a schematic diagram of a fourth embodiment of the disclosure. In some embodiments of the disclosure, the streaming server can transmit a plurality of stream data packets to the stream receiver in batches. Some embodiments shown in FIG. 5 includes the following.

In 501, a streaming request from a stream receiver is received, in which the streaming request includes a stream identifier and a type of the stream receiver.

In 502, an encapsulated stream is obtained by performing protocol encapsulation on a stream corresponding to the stream identifier based on a streaming protocol corresponding to the type.

In 503, a plurality of stream data packets to be transmitted to the stream receiver are determined based on the encapsulated stream.

It should be understood that when the streaming server transmits the stream, the stream is divided into a plurality of stream data packets. Each time the streaming server transmits a stream data packet, when the stream receiver receives the stream data packet, an Acknowledge character (ACK) will be fed back to the streaming server. In order to reduce the number of times that the stream receiver transmits the ACK and to save the related resource consumption of the streaming server, in some embodiments of the disclosure, after obtaining the encapsulated stream, the streaming server can cache the plurality of stream data packets to be transmitted to the stream receiver, so that the streaming server transmits the stream to the stream receiver in batches. For example, the streaming server can set a MSG_MORE identifier to mark the number of data packets transmitted to the stream receiver in each batch.

In 504, the plurality of stream data packets are transmitted to the stream receiver in batches.

Further, in order to improve a throughput of the streaming server, the streaming server may transmit the plurality of cached stream data packets to the stream receiver in batches.

In some embodiments of the disclosure, 501-502 may be implemented in any of some embodiments of the disclosure, which are not limited in some embodiments of the disclosure, and will not be described again.

In conclusion, the streaming request of the stream receiver is received, in which the streaming request includes the stream identifier and the type of the stream receiver. The encapsulated stream is obtained by performing the protocol encapsulation on the stream corresponding to the stream identifier based on the streaming protocol corresponding to the type. The plurality of stream data packets to be transmitted to the stream receiver are determined based on the encapsulated stream. The plurality of stream data packets are transmitted to the stream receiver in batches. Therefore, the streaming server divides the encapsulated stream into the plurality of stream data packets, and transmits the plurality of stream data packets to the stream receiver in batches, and the stream receiver can directly process the encapsulated stream, which improves the performance of the streaming server, saves the related resource consumption, and improves the real-time performance of the stream.

Figure 6:
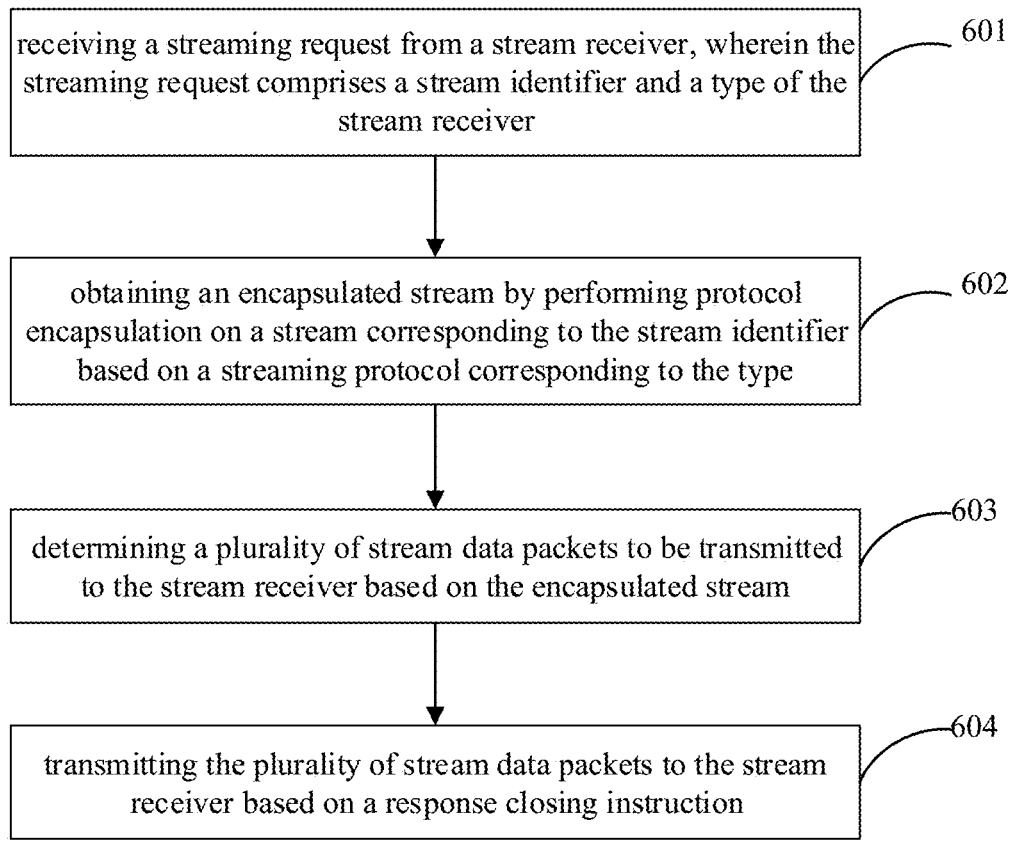
FIG. 6 is a schematic diagram of a fifth embodiment of the disclosure.

In order to improve the performance of the streaming server and improve the real-time performance of the stream, as shown in FIG. 6, FIG. 6 is a schematic diagram of a fifth embodiment of the disclosure. In some embodiments of the disclosure, the streaming server may transmit a plurality of stream data packets to the stream receiver based on a response closing instruction. Some embodiments shown in FIG. 6 may include the following.

In 601, a streaming request from a stream receiver is received, in which the streaming request includes a stream identifier and a type of the stream receiver.

In 602, an encapsulated stream is obtained by performing protocol encapsulation on a stream corresponding to the stream identifier based on a streaming protocol corresponding to the type.

In 603, a plurality of stream data packets to be transmitted to the stream receiver are determined based on the encapsulated stream.

In 604, the plurality of stream data packets are transmitted to the stream receiver based on a response closing instruction.

In order to improve the real-time performance of the stream and improve the transmission efficiency, the streaming server can transmit the plurality of stream data packets to the stream receiver based on the response closing instruction. For example, TCP_NODELAY can be closed to transmit the plurality of stream data packets to the stream receiver.

In some embodiments of the disclosure, 601-603 may be implemented in any of some embodiments of the disclosure, which is not limited in some embodiments of the disclosure, and will not be repeated.

In conclusion, the streaming request of the stream receiver is received, in which the streaming request includes the stream identifier and the type of the stream receiver. The encapsulated stream is obtained by performing the protocol encapsulation on the stream corresponding to the stream identifier based on the streaming protocol corresponding to the type. The plurality of stream data packets to be transmitted to the stream receiver are determined based on the encapsulated stream. The plurality of stream data packets are transmitted to the stream receiver based on the response closing instruction. Therefore, the streaming server divides the encapsulated stream into the plurality of stream data packets, and transmits the plurality of stream data packets to the stream receiver based on the response closing instruction, and the stream receiver can directly process the encapsulated stream, so that the transmission efficiency of the streaming server is improved, and the stream receiver can directly process the encapsulated stream, which improves the real-time performance of the stream.

Figure 7:
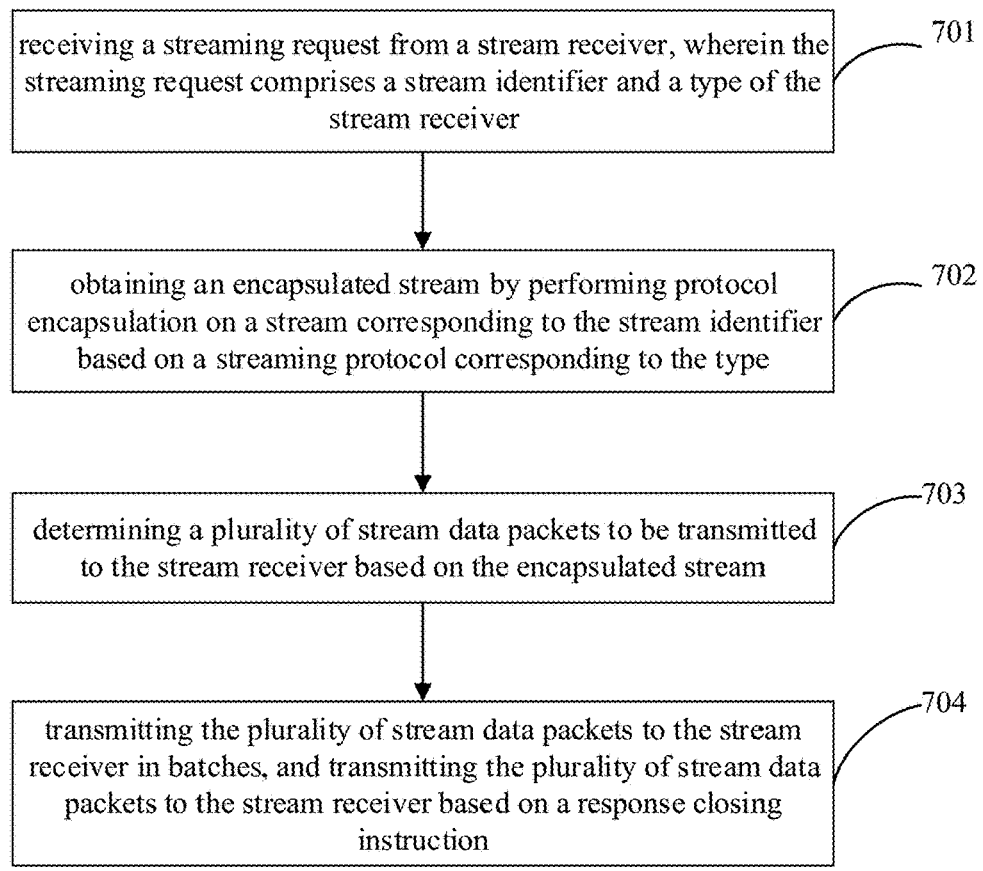
FIG. 7 is a schematic diagram of a sixth embodiment of the disclosure.

In order to improve the performance of the streaming server, improve the transmission efficiency, and improve the real-time performance of the stream, as shown in FIG. 7, FIG. 7 is a schematic diagram of a sixth embodiment of the disclosure. In some embodiments of the disclosure, the streaming server may transmit the plurality of stream data packets to the stream receiver in batches, and transmit the plurality of stream data packets to the stream receiver based on the response closing instruction simultaneously. Some embodiments shown in FIG. 7 may include the following.

In 701, a streaming request from a stream receiver is received, in which the streaming request includes a stream identifier and a type of the stream receiver.

In 702, an encapsulated stream is obtained by performing protocol encapsulation on a stream corresponding to the stream identifier based on a streaming protocol corresponding to the type.

In 703, a plurality of stream data packets to be transmitted to the stream receiver are determined based on the encapsulated stream.

In 704, the plurality of stream data packets are transmitted to the stream receiver in batches, and the plurality of stream data packets are transmitted to the stream receiver based on a response closing instruction.

For example, the streaming server can set a MSG_MORE identifier to mark the number of data packets transmitted to the stream receiver in each batch. The MSG_MORE identifier is adopted, and the plurality of stream data packets are transmitted to the stream receiver in batches. At the same time, TCP_NODELAY can be closed to transmit the plurality of stream data packets to the stream receiver.

In some embodiments of the disclosure, 701-703 may be implemented in any of some embodiments of the disclosure, which is not limited in some embodiments of the disclosure, and will not be repeated.

In conclusion, the streaming request of the stream receiver is received, in which the streaming request includes the stream identifier and the type of the stream receiver. The encapsulated stream is obtained by performing the protocol encapsulation on the stream corresponding to the stream identifier based on the streaming protocol corresponding to the type. The plurality of stream data packets to be transmitted to the stream receiver are determined based on the encapsulated stream. The plurality of stream data packets are transmitted to the stream receiver in batches, and the plurality of stream data packets are transmitted to the stream receiver based on the response closing instruction. Therefore, the efficiency of the streaming server for transmitting the stream can be improved, and the performance of the streaming server can be improved simultaneously, so that the related resource consumption can be saved, and the stream receiver can directly process the encapsulated stream, thereby improving the real-time performance of the stream.

Figure 8:
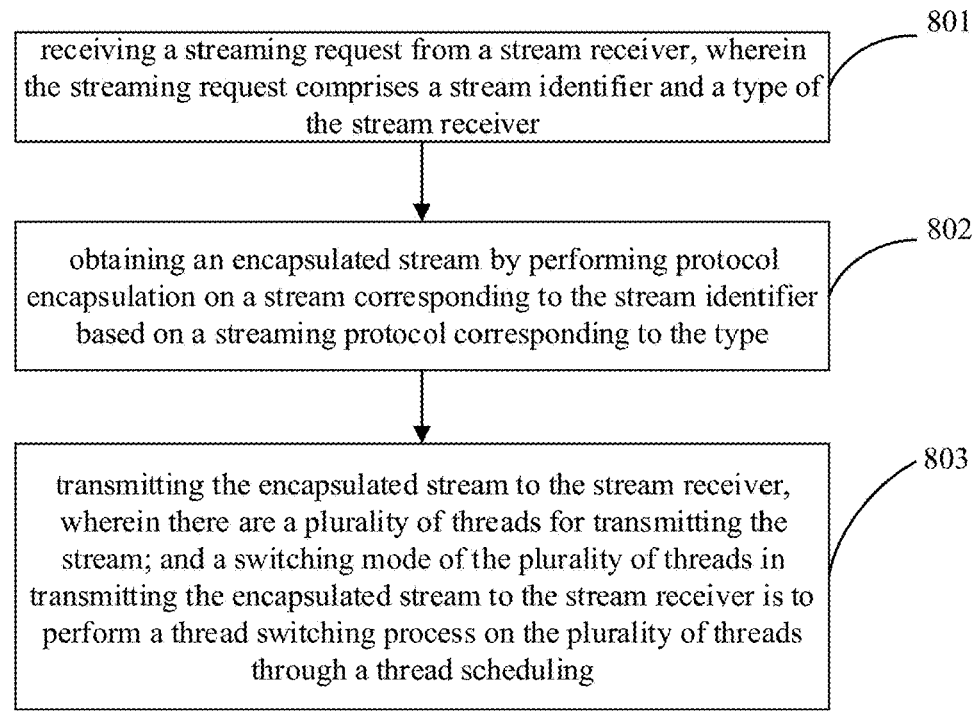
FIG. 8 is a schematic diagram of a seventh embodiment of the disclosure.

In order to improve the performance of the streaming server and improve the real-time performance of the stream, as shown in FIG. 8, FIG. 8 is a schematic diagram of a seventh embodiment of the disclosure. In some embodiments of the disclosure, the performance of the streaming server can be improved by reducing a number of thread switching in the stream transmission process. Some embodiments shown in FIG. 8 may include the following.

In 801, a streaming request from a stream receiver is received, in which the streaming request includes a stream identifier and a type of the stream receiver.

In 802, an encapsulated stream is obtained by performing protocol encapsulation on a stream corresponding to the stream identifier based on a streaming protocol corresponding to the type.

In 803, the encapsulated stream is transmitted to the stream receiver, in which there are a plurality of threads for transmitting the stream; and a switching mode of the plurality of threads in transmitting the encapsulated stream to the stream receiver is to perform a thread switching process on the plurality of threads through a thread scheduling.

It should be understood that the streaming server transmits the stream to the stream receiver through thread switching. Since the thread scheduling overhead is relatively large, and if the thread is scheduled once every time the thread is switched, it will seriously affect the performance of the streaming server. Therefore, in order to improve the performance of the streaming server, thread switching processing can be performed on multiple threads through one thread scheduling in the process of transmitting the encapsulated stream to the stream receiver. For example, if these 10K users are distributed on 32 central processing unit (CPU) cores, then a maximum of 32 thread switching is performed, and thread scheduling is performed for the switching processing of multiple threads at one time, thereby reducing the number of thread scheduling, and improving the performance of the streaming server.

In some embodiments of the disclosure, 801-802 may be implemented in any of some embodiments of the disclosure, which are not limited in some embodiments of the disclosure, and will not be described again.

In conclusion, the streaming request of the stream receiver is received, in which the streaming request includes the stream identifier and the type of the stream receiver. The encapsulated stream is obtained by performing the protocol encapsulation on the stream corresponding to the stream identifier based on the streaming protocol corresponding to the type. The encapsulated stream is transmitted to the stream receiver. There are a plurality of threads for transmitting the stream. The switching mode of the plurality of threads in transmitting the encapsulated stream to the stream receiver is to perform a thread switching process on the plurality of threads through a thread scheduling. Therefore, in the process of transmitting the encapsulated stream to the stream receiver, the thread switching processing can be performed on multiple threads through one thread scheduling, and the stream receiver can directly process the encapsulated stream, which improves the performance of the streaming server, and improves the real-time performance of the stream.

Figure 9:
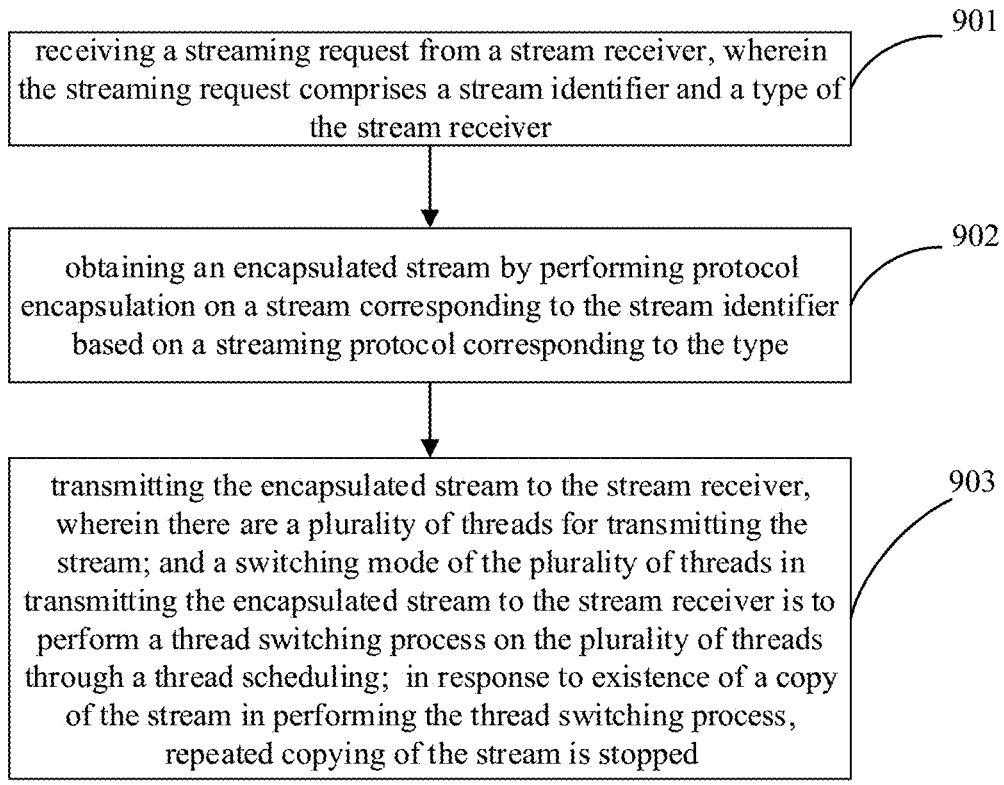
FIG. 9 is a schematic diagram of an eighth embodiment of the disclosure.

In order to improve the performance of the streaming server and improve the real-time performance of the stream, as shown in FIG. 9, FIG. 9 is a schematic diagram of an eighth embodiment of the disclosure. In some embodiments of the disclosure, when there is a copy of the stream, repeated copying of the stream can be stopped, so as to improve the performance of the streaming server and improve the real-time performance of the stream. Some embodiments shown in FIG. 9 includes the following.

In 901, a streaming request from a stream receiver is received, in which the streaming request includes a stream identifier and a type of the stream receiver.

In 902, an encapsulated stream is obtained by performing protocol encapsulation on a stream corresponding to the stream identifier based on a streaming protocol corresponding to the type.

In 903, the encapsulated stream is transmitted to the stream receiver, in which there are a plurality of threads for transmitting the stream; and a switching mode of the plurality of threads in transmitting the encapsulated stream to the stream receiver is to perform a thread switching process on the plurality of threads through a thread scheduling; and in response to existence of a copy of the stream in performing the thread switching process, repeated copying of the stream is stopped.

It should be understood that, in the process of thread switching processing, in order to ensure the thread safety, the thread safety can be ensured by copying the stream. If each thread switching process copies the transmitted stream, the performance overhead of the streaming server is relatively large. In order to reduce the performance overhead of the streaming server, during the thread switching process, if there is a copy of the stream, the repeated copying of the stream is stopped, and multiple threads share the same stream. For example, taking the stream as the video stream as an example, when the same video stream is forwarded to multiple clients, the C++ 11 reference technology can be used to count, and if it is found that the video stream has been copied, the repeated copying of the video stream is stopped, and multiple clients share the same video stream.

In some embodiments of the disclosure, 901-902 may be implemented in any of some embodiments of the disclosure, which are not limited in some embodiments of the disclosure, and will not be described again.

In conclusion, the streaming request of the stream receiver is received, in which the streaming request includes the stream identifier and the type of the stream receiver. The encapsulated stream is obtained by performing the protocol encapsulation on the stream corresponding to the stream identifier based on the streaming protocol corresponding to the type. The encapsulated stream is transmitted to the stream receiver. There are a plurality of threads for transmitting the stream. The switching mode of the plurality of threads in transmitting the encapsulated stream to the stream receiver is to perform a thread switching process on the plurality of threads through a thread scheduling. In the thread switching process, when there is the copy of the stream, the repeated copying of the stream is stopped. Therefore, the performance overhead of the streaming server is reduced, the performance of the streaming server is improved, and the stream receiver can directly process the encapsulated stream, thereby improving the real-time performance of the stream.

According to the method for transmitting the stream in some embodiments of the disclosure, the streaming request of the stream receiver is received by the streaming server. The encapsulated stream is obtained by performing the protocol encapsulation on the stream corresponding to the stream identifier based on the streaming protocol corresponding to the type. The encapsulated stream is transmitted to the stream receiver. Therefore, the stream receiver can directly process the encapsulated stream, which improves the real-time performance of the stream.

In order to implement the above embodiments, some embodiments of the disclosure further provide a streaming server.

Figure 10:
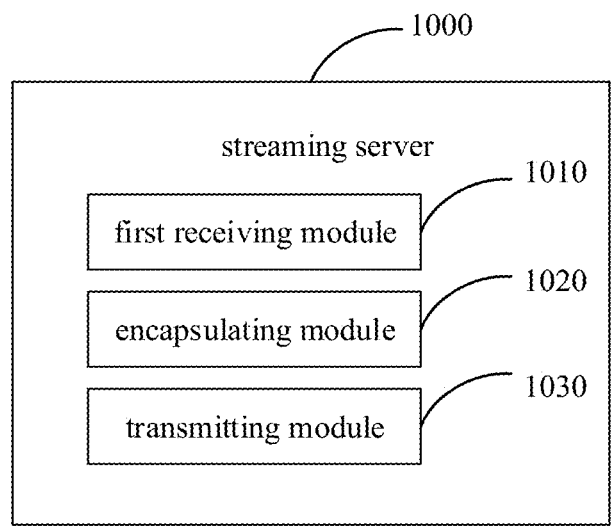
FIG. 10 is a schematic diagram of a ninth embodiment of the disclosure.

FIG. 10 is a schematic diagram according to a ninth embodiment of the disclosure. As shown in FIG. 10, a streaming server 1000 includes a first receiving module 1010, an encapsulating module 1020 and a transmitting module 1030.

The first receiving module 1010 is configured to receive a streaming request from a stream receiver, in which the streaming request includes a stream identifier and a type of the stream receiver. The encapsulating module 1020 is configured to obtain an encapsulated stream by performing protocol encapsulation on a stream corresponding to the stream identifier based on a streaming protocol corresponding to the type. The transmitting module 1030 is configured to transmit the encapsulated stream to the stream receiver.

In a possible implementation of some embodiments of the disclosure, the streaming server 1000 further includes a determining module, a pushing module and a second receiving module. The determining module is configured to determine, in response to receiving a stream address application request from a signaling server, an address and a port for a stream to be received on the streaming server. The pushing module is configured to transmit the address and the port to the signaling server to request a third-party platform to push streams. The second receiving module is configured to receive a stream pushed by the third-party platform based on the address and the port.

In a possible implementation of some embodiments of the disclosure, the second receiving module is further configured to: adjust a capacity of a buffer queue based on a type of the stream; receive a stream data packet pushed by the third-party platform based on the address and the port; cache the stream data packet into the buffer queue; integrate stream data packets in the buffer queue into the stream in response to the stream data packets in the buffer queue satisfying the capacity; and clear the buffer queue.

In a possible implementation of some embodiments of the disclosure, the transmitting module 1030 is further configured to: determine a plurality of stream data packets to be transmitted to the stream receiver based on the encapsulated stream; transmit the plurality of stream data packets to the stream receiver in batches; and/or, transmit the plurality of stream data packets to the stream receiver based on a response closing instruction.

In a possible implementation of some embodiments of the disclosure, there are a plurality of threads for transmitting the stream; and the server further includes: a switching process module, configured to perform a thread switching process on the plurality of threads through a thread scheduling in transmitting the encapsulated stream to the stream receiver.

In a possible implementation of some embodiments of the disclosure, the switching process module is further configured to: in response to existence of a copy of the stream in performing the thread switching process, stop repeated copying of the stream.

The streaming server in some embodiments of the disclosure receives the streaming request of the stream receiver, obtains the encapsulated stream by performing the protocol encapsulation on the stream corresponding to the stream identifier based on the streaming protocol corresponding to the type, and transmits the encapsulated stream to the stream receiver. Therefore, the stream receiver can directly process the encapsulated stream, which improves the real-time performance of the stream.

In order to realize the above embodiments, some embodiments of the disclosure also provide a streaming system, including a streaming server cluster and a signaling server cluster. The streaming server cluster is coupled to the signaling server cluster, a stream receiver and a third-party platform respectively for executing the method for transmitting the stream described in some embodiments of the disclosure.

In a possible implementation of some embodiments of the disclosure, the signaling server cluster interacts with the third-party platform based on a national-standard protocol for interacting with the third-party platform, and the streaming server cluster interacts with the third-party platform based on the national-standard protocol for interacting with the third-party platform.

Figure 11:
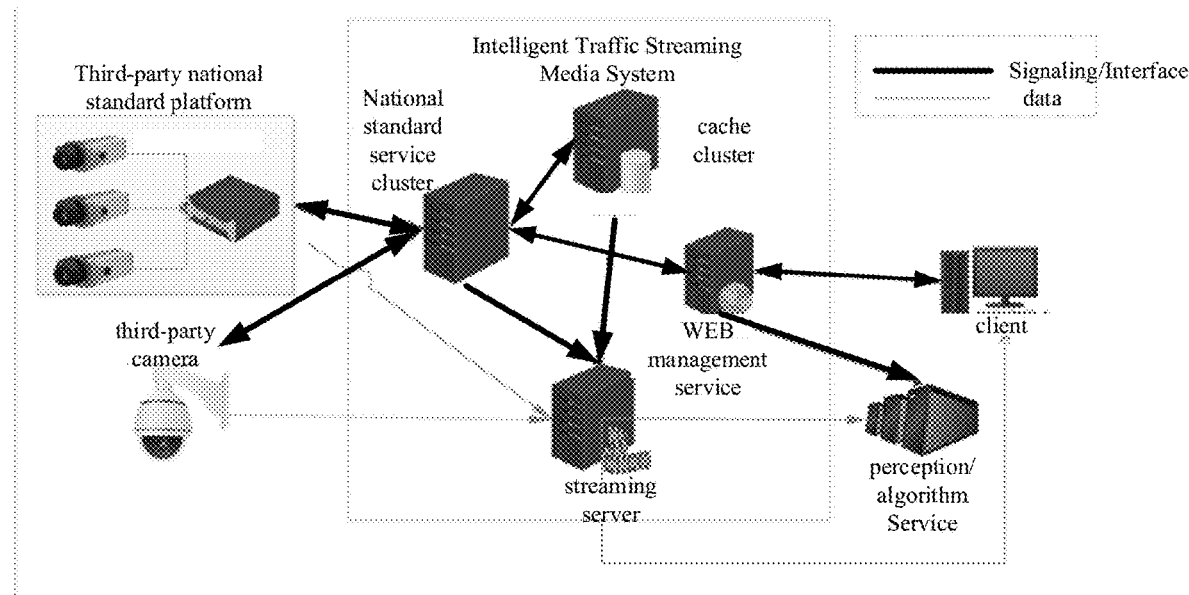
FIG. 11 is a schematic diagram of a streaming system according to some embodiments of the disclosure.

For example, as shown in FIG. 11, FIG. 11 is a schematic diagram of a streaming system according to some embodiments of the disclosure. In FIG. 11, the third-party national standard platform equates to the third-party platform of some embodiments of the disclosure. The national standard service cluster equates to the signaling server cluster of some embodiments of the disclosure. The client equates to the stream receiver. The streaming server cluster can be connected to the national standard service cluster (signaling server cluster), the client (stream receiver) and the third-party national standard platform (the third-party platform). The signaling server cluster interacts with the third-party platform based on the national-standard protocol for interacting with the third-party platform. The streaming server cluster interacts with the third-party platform based on the national-standard protocol for interacting with the third-party platform.

According to some embodiments of the disclosure, the disclosure also provides an electronic device, a readable storage medium and a computer program product.

Figure 12:
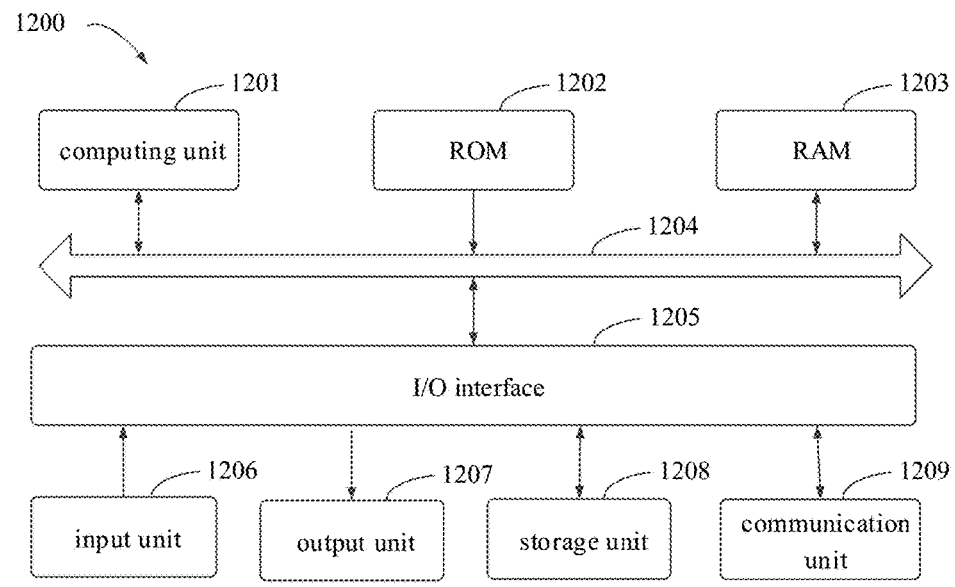
FIG. 12 is a block diagram of an electronic device for transmitting a stream according to some embodiments of the disclosure.

FIG. 12 is a block diagram of an electronic device 1200 for implementing some embodiments of the disclosure. Electronic devices are intended to represent various forms of digital computers, such as laptop computers, desktop computers, workbenches, personal digital assistants, servers, blade servers, mainframe computers, and other suitable computers. Electronic devices may also represent various forms of mobile devices, such as personal digital processing, cellular phones, smart phones, wearable devices, and other similar computing devices. The components shown here, their connections and relations, and their functions are merely examples, and are not intended to limit the implementation of the disclosure described and/or required herein.

As illustrated in FIG. 12, the device 1200 includes a computing unit 1201 performing various appropriate actions and processes based on computer programs stored in a read-only memory (ROM) 1202 or computer programs loaded from the storage unit 1208 to a random access memory (RAM) 1203. In the RAM 1203, various programs and data required for the operation of the device 1200 are stored. The computing unit 1201, the ROM 1202, and the RAM 1203 are connected to each other through a bus 1204. An input/output (I/O) interface 1205 is also connected to the bus 1204.

Components in the device 1200 are connected to the I/O interface 1205, including: an inputting unit 1206, such as a keyboard, a mouse; an outputting unit 1207, such as various types of displays, speakers; a storage unit 1208, such as a disk, an optical disk; and a communication unit 1209, such as network cards, modems, and wireless communication transceivers. The communication unit 1209 allows the device 1200 to exchange information/data with other devices through a computer network such as the Internet and/or various telecommunication networks.

The computing unit 1201 may be various general-purpose and/or dedicated processing components with processing and computing capabilities. Some examples of computing unit 1201 include, but are not limited to, a central processing unit (CPU), a graphics processing unit (GPU), various dedicated AI computing chips, various computing units that run machine learning model algorithms, and a digital signal processor (DSP), and any appropriate processor, controller and microcontroller. The computing unit 1201 executes the various methods and processes described above, such as the method for transmitting a stream. For example, in some embodiments, the method may be implemented as a computer software program, which is tangibly contained in a machine-readable medium, such as the storage unit 1208. In some embodiments, part or all of the computer program may be loaded and/or installed on the device 1200 via the ROM 1202 and/or the communication unit 1209. When the computer program is loaded on the RAM 1203 and executed by the computing unit 1201, one or more steps of the method described above may be executed. Alternatively, in other embodiments, the computing unit 1201 may be configured to perform the method in any other suitable manner (for example, by means of firmware).

Various implementations of the systems and techniques described above may be implemented by a digital electronic circuit system, an integrated circuit system, Field Programmable Gate Arrays (FPGAs), Application Specific Integrated Circuits (ASICs), Application Specific Standard Products (ASSPs), System on Chip (SOCs), Load programmable logic devices (CPLDs), computer hardware, firmware, software, and/or a combination thereof. These various embodiments may be implemented in one or more computer programs, the one or more computer programs may be executed and/or interpreted on a programmable system including at least one programmable processor, which may be a dedicated or general programmable processor for receiving data and instructions from the storage system, at least one input device and at least one output device, and transmitting the data and instructions to the storage system, the at least one input device and the at least one output device.

The program code configured to implement the method of the disclosure may be written in any combination of one or more programming languages. These program codes may be provided to the processors or controllers of general-purpose computers, dedicated computers, or other programmable data processing devices, so that the program codes, when executed by the processors or controllers, enable the functions/operations specified in the flowchart and/or block diagram to be implemented. The program code may be executed entirely on the machine, partly executed on the machine, partly executed on the machine and partly executed on the remote machine as an independent software package, or entirely executed on the remote machine or server.

In the context of the disclosure, a machine-readable medium may be a tangible medium that may contain or store a program for use by or in connection with an instruction execution system, apparatus, or device. The machine-readable medium may be a machine-readable signal medium or a machine-readable storage medium. A machine-readable medium may include, but is not limited to, an electronic, magnetic, optical, electromagnetic, infrared, or semiconductor system, apparatus, or device, or any suitable combination of the foregoing. More specific examples of machine-readable storage media include electrical connections based on one or more wires, portable computer disks, hard disks, random access memories (RAM), read-only memories (ROM), electrically programmable read-only-memory (EPROM), flash memory, fiber optics, compact disc read-only memories (CD-ROM), optical storage devices, magnetic storage devices, or any suitable combination of the foregoing.

In order to provide interaction with a user, the systems and techniques described herein may be implemented on a computer having a display device (e.g., a Cathode Ray Tube (CRT) or a Liquid Crystal Display (LCD) monitor for displaying information to a user); and a keyboard and pointing device (such as a mouse or trackball) through which the user can provide input to the computer. Other kinds of devices may also be used to provide interaction with the user. For example, the feedback provided to the user may be any form of sensory feedback (e.g., visual feedback, auditory feedback, or haptic feedback), and the input from the user may be received in any form (including acoustic input, voice input, or tactile input).

The systems and technologies described herein can be implemented in a computing system that includes background components (for example, a data server), or a computing system that includes middleware components (for example, an application server), or a computing system that includes front-end components (for example, a user computer with a graphical user interface or a web browser, through which the user can interact with the implementation of the systems and technologies described herein), or include such background components, intermediate computing components, or any combination of front-end components. The components of the system may be interconnected by any form or medium of digital data communication (e.g., a communication network). Examples of communication networks include: local area network (LAN), wide area network (WAN), the Internet and Block-chain network.

The computer system may include a client and a server. The client and server are generally remote from each other and interacting through a communication network. The client-server relation is generated by computer programs running on the respective computers and having a client-server relation with each other. The server may be a server of a distributed system, or a server combined with a block-chain.

It should be noted that AI is the study of making computers to simulate certain thinking processes and intelligent behaviors of humans (such as learning, reasoning, thinking and planning), which has both hardware-level technologies and software-level technologies. AI hardware technologies generally include technologies such as sensors, dedicated AI chips, cloud computing, distributed storage, and big data processing. AI software technologies mainly include computer vision, speech recognition technology, natural language processing technology, machine learning/deep learning, big data processing technology, knowledge graph technology and other major directions.

It should be understood that the various forms of processes shown above can be used to reorder, add or delete steps. For example, the steps described in the disclosure could be performed in parallel, sequentially, or in a different order, as long as the desired result of the technical solution disclosed in the disclosure is achieved, which is not limited herein.

The above specific embodiments do not constitute a limitation on the protection scope of the disclosure. Those skilled in the art should understand that various modifications, combinations, sub-combinations and substitutions can be made according to design requirements and other factors. Any modification, equivalent replacement and improvement made within the spirit and principle of the disclosure shall be included in the protection scope of the disclosure.

What is claimed is:

1. A method for transmitting a stream, performed by a streaming server, comprising:
   receiving a streaming request from a stream receiver, wherein the streaming request comprises a stream identifier and a type of the stream receiver;
   obtaining an encapsulated stream by performing protocol encapsulation on a stream corresponding to the stream identifier based on a streaming protocol corresponding to the type; and
   transmitting the encapsulated stream to the stream receiver,
   wherein the method further comprises:
   determining, in response to receiving a stream address application request from a signaling server, an address and a port for a stream to be received on the streaming server;
   transmitting the address and the port to the signaling server to request a third-party platform to push streams; and
   receiving a stream pushed by the third-party platform based on the address and the port,
   wherein receiving the stream pushed by the third-party platform based on the address and the port comprises:
   adjusting a capacity of a buffer queue based on a type of the stream;
   receiving a stream data packet pushed by the third-party platform based on the address and the port;
   caching the stream data packet into the buffer queue;
   integrating stream data packets in the buffer queue into the stream in response to the stream data packets in the buffer queue satisfying the capacity; and
   clearing the buffer queue.

2. The method of claim 1, wherein transmitting the encapsulated stream to the stream receiver comprises:
   determining a plurality of stream data packets to be transmitted to the stream receiver based on the encapsulated stream; and
   transmitting the plurality of stream data packets to the stream receiver in batches.

3. The method of claim 1, wherein transmitting the encapsulated stream to the stream receiver comprises:

determining a plurality of stream data packets to be transmitted to the stream receiver based on the encapsulated stream; and transmitting the plurality of stream data packets to the stream receiver based on a response closing instruction.

4. The method of claim 1, wherein there are a plurality of threads for transmitting the stream; and a switching mode of the plurality of threads in transmitting the encapsulated stream to the stream receiver is to perform a thread switching process on the plurality of threads through a thread scheduling.

5. The method of claim 4, further comprising:

in response to existence of a copy of the stream in performing the thread switching process, stopping repeated copying of the stream.

6. A streaming server, comprising:

at least one processor; and a memory communicatively connected to the at least one processor; wherein, the memory is configured to store instructions executable by the at least one processor, and when the instructions are executed by the at least one processor, the at least one processor is caused to perform:

receiving a streaming request from a stream receiver, wherein the streaming request comprises a stream identifier and a type of the stream receiver;

obtaining an encapsulated stream by performing protocol encapsulation on a stream corresponding to the stream identifier based on a streaming protocol corresponding to the type; and transmitting the encapsulated stream to the stream receiver, wherein when the instructions are executed by the at least one processor, the at least one processor is caused to perform:

determining, in response to receiving a stream address application request from a signaling server, an address and a port for a stream to be received on the streaming server;

transmitting the address and the port to the signaling server to request a third-party platform to push streams; and receiving a stream pushed by the third-party platform based on the address and the port, wherein when the instructions are executed by the at least one processor, the at least one processor is caused to perform:

adjusting a capacity of a buffer queue based on a type of the stream;

receiving a stream data packet pushed by the third-party platform based on the address and the port;

caching the stream data packet into the buffer queue;

integrating stream data packets in the buffer queue into the stream in response to the stream data packets in the buffer queue satisfying the capacity; and clearing the buffer queue.

7. The server of claim 6, wherein when the instructions are executed by the at least one processor, the at least one processor is caused to perform:

determining a plurality of stream data packets to be transmitted to the stream receiver based on the encapsulated stream; and transmitting the plurality of stream data packets to the stream receiver in batches.

8. The server of claim 6, wherein when the instructions are executed by the at least one processor, the at least one processor is caused to perform:

determining a plurality of stream data packets to be transmitted to the stream receiver based on the encapsulated stream; and transmitting the plurality of stream data packets to the stream receiver based on a response closing instruction.

9. The server of claim 6, wherein there are a plurality of threads for transmitting the stream; and a switching mode of the plurality of threads in transmitting the encapsulated stream to the stream receiver is to perform a thread switching process on the plurality of threads through a thread scheduling.

10. The server of claim 9, wherein when the instructions are executed by the at least one processor, the at least one processor is caused to perform:

in response to existence of a copy of the stream in performing the thread switching process, stopping repeated copying of the stream.

11. A non-transitory computer-readable storage medium storing computer instructions, wherein the computer instructions are configured to cause a computer to perform a method for transmitting a stream, the method comprising:

receiving a streaming request from a stream receiver, wherein the streaming request comprises a stream identifier and a type of the stream receiver;

obtaining an encapsulated stream by performing protocol encapsulation on a stream corresponding to the stream identifier based on a streaming protocol corresponding to the type; and transmitting the encapsulated stream to the stream receiver, wherein the method further comprises:

determining, in response to receiving a stream address application request from a signaling server, an address and a port for a stream to be received on the streaming server;

transmitting the address and the port to the signaling server to request a third-party platform to push streams; and receiving a stream pushed by the third-party platform based on the address and the port, wherein receiving the stream pushed by the third-party platform based on the address and the port comprises:

adjusting a capacity of a buffer queue based on a type of the stream;

receiving a stream data packet pushed by the third-party platform based on the address and the port;

caching the stream data packet into the buffer queue;

integrating stream data packets in the buffer queue into the stream in response to the stream data packets in the buffer queue satisfying the capacity; and clearing the buffer queue.

12. The non-transitory computer-readable storage medium of claim 11, wherein transmitting the encapsulated stream to the stream receiver comprises:

determining a plurality of stream data packets to be transmitted to the stream receiver based on the encapsulated stream; and transmitting the plurality of stream data packets to the stream receiver in batches, and/or transmitting the plurality of stream data packets to the stream receiver based on a response closing instruction.

13. The non-transitory computer-readable storage medium of claim 11, wherein there are a plurality of threads for transmitting the stream; and a switching mode of the plurality of threads in transmitting the encapsulated stream to the stream receiver is to perform a thread switching process on the plurality of threads through a thread scheduling.

14. The non-transitory computer-readable storage medium of claim 13, wherein the method further comprises:
  in response to existence of a copy of the stream in performing the thread switching process, stopping repeated copying of the stream.

* * * * *